United States Patent Office 3,526,623
Patented Sept. 1, 1970

3,526,623
URETHANE DRYING OILS
Perry A. Argabright and Brian L. Phillips, Littleton, Colo., assignors to Marathon Oil Company, Findlay, Ohio, a corporation of Ohio
No Drawing. Filed Dec. 17, 1965, Ser. No. 514,721
Int. Cl. C07d 55/38; C08g 22/06
U.S. Cl. 260—248
11 Claims

ABSTRACT OF THE DISCLOSURE

The present invention comprises a process for the preparation of unsaturated urethane drying oils comprising the step of reacting a hydroxyl-containing ester of an unsaturated fatty acid with a dihalide, and a metal cyanate and related compositions. The new urethane drying oils have many uses including use as coatings for wood and other surfaces.

---

The present invention relates to new urethane drying oils and methods for their preparation, and in particular, relates to methods for the preparation of such drying oils by the reaction of hydroxyl-containing esters of unsaturated fatty acids, organic dihalides, and metal cyanates to form polyester-urethanes containing unsaturation.

Urethane drying oils offer advantages as coatings for wood and other surfaces where superior resistance to abrasion hardness, acids, alkalis, and weather is required. The major disadvantage of presently available urethane drying oils is their tendency to discolor and degrade when exposed to sunlight and the elements.

The present invention permits the production of new drying oils of the urethane type in which the nitrogen of the urethane radical

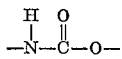

is not attached to an aromatic ring. It has been discovered that drying oils having this special molecular characteristic are markedly less subject to degradation and discoloration than are the conventionally produced aromatic-containing urethane drying oils in which nitrogen is attached to the aromatic ring. In addition, the present invention permits the production of urethane drying oils which automatically contain at least about 0.1 and preferably from 1 to 10 mole percent based on the moles of nitrogen in the drying oil of isocyanurate groups which have been discovered to lend additional stability and resistance to degradation to the finished film.

In addition to the superior quality of the finished films produced by the present invention, the invention offers two distinct economic advantages. These are:

(A) The production of the urethane drying oils is accomplished in a single step reaction which minimizes the operating costs, the required equipment, and related capital investment; and (B) The invention makes possible the use of aliphatic dihalides in place of the considerably more expensive aliphatic diisocyanates which have been conventionally employed as starting materials.

Finally, the urethane oils of this invention do not contain unreacted isocyanates which are a health hazard in the handling of conventional urethane based paints.

In general, the invention involves the following reaction:

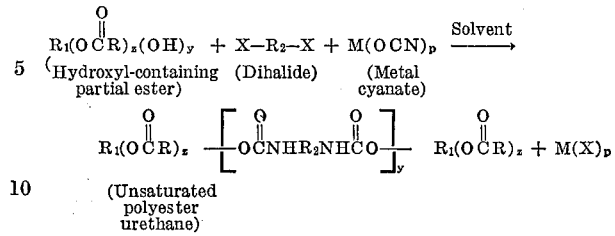

(Unsaturated polyester urethane)

Where $R_1$ is a polyvalent (valence=$z+y$) organic radical which is preferably a saturated hydrocarbon, more preferably an alkyl or aralkyl radical and most preferably an aliphatic radical and where $R_1$ preferably has from 1 to about 20 and most preferably from 2 to about 10 carbon atoms. (A mixture of different polyols containing different $R_1$'s may be employed.)

Where $R_2$ is a divalent organic radical in which the halogens are attached to aliphatic carbon atoms, preferably primary aliphatic carbon atoms. $R_2$ preferably contains from 2 to about 100 carbon atoms, most preferably from 4 to about 20 carbon atoms. Particularly preferred are $R_2$'s which are unsaturated in such positions as to render the halogens allylic or benzylic.

Where R is a monovalent unsaturated hydrocarbon group, preferably an aliphatic radical containing from 1 to about 5 double bonds and most preferably from 1 to about 3 double bonds. R preferably has from 5 to 30 and most preferably from 10 to about 20 carbon atoms.

It will be understood that any substitutions and incorporations into the above R, $R_1$, and $R_2$ groups may be made without departing from the spirit of the invention. Where the R, $R_1$, and $R_2$ groups are so substituted, e.g., as with nitro derivatives, or with oxygens incorporated into the chain to form polyether radicals, these are herein termed the "non-interfering derivatives" of the compounds in question.

Where $z$ is from about 1 to 5 and preferably from about 1 to 3.

Where $y$ is from 1 to about 5 and preferably from 1 to 3.

Where the ratio of $z$ to $y$ is preferably from about 0.5 to 5 and most preferably from about 0.5 to 2 and wherein the halogen (X) to hydroxy molar ratio is preferably from about 1.5 to 0.5 and most preferably from 0.8 to 1.2.

Where the ratio of NCO to X is preferably from 1.0 to 1.5 and most preferably from about 1.05 to 1.2.

Where M is any metal ion (metal as used herein is intended to include also organic radicals which, for the purpose of the invention, act as metals, e.g., pyridinium, tetraalkyl ammonium radical, etc.) and is preferably selected from the group consisting of the aforementioned organic radicals and Li, Na, K, Rb, Ag, Be, Ca, Mg, Pb, and most preferably K or Na; and where p is the valence of the metal.

Where X is a halogen such as Cl, Br, and I, preferably Cl and Br, and where the solvent is preferably aprotic.

Some of the advantages of the present invention in the avoidance of the attachment of the aromatic ring to the nitrogen of the urethane group can be seen by comparing the above reaction of the present invention with the conventional preparation of urethane drying oils by reaction of a diisocyanate with a hydroxyl-containing drying oil derivative according to the formula:

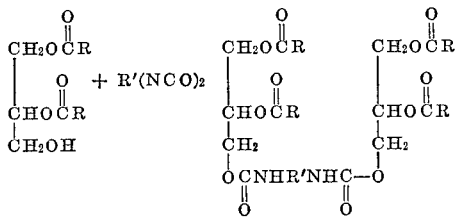

In conventional preparations, R′ is almost always an aromatic group because of the high cost of aliphatic diisocyanates. Because the present invention allows the use of an aliphatic dihalide or aryl insulated from the halogen by-alkyl, improvement over the prior art extends to both stability of finished coating and to economy.

Hydroxyl containing unsaturated partial esters of fatty acids which contain either primary or secondary hydroxyl groups are suitable for use as starting materials in the reactions of the present invention, but primary hydroxyl groups are preferred. In general, production of suitable partial esters, preferably is accomplished by trans-esterification of unsaturated fatty acid esters with a suitable polyol such as glycerol using suitable trans-esterification catalysts, e.g., PbO, Ca naphthenate, NaOH, KOH and CaO; most preferably PbO, and Ca naphthenate. The ratio of ester to polyol in the trans-esterification reaction controls the average number of hydroxyl groups per molecule in the resulting partial esters, and this ratio should be controlled according to the preferred hydroxyl groups per molecule discussed above.

Suitable partial esters for use in the invention can be produced from esters of the type:

$$R_1(OCR)_x$$
$$\phantom{R_1(O}\overset{\|}{\phantom{C}}\overset{O}{\phantom{R)_x}}$$

where $R_1$ is derived from a polyol as, for example, ethylene glycol, glycerol, trimethylol propane, and pentaerythritol. The $$-O\overset{O}{\overset{\|}{C}}R$$

group is derived from an unsaturated fatty acid such as those normally occurring in linseed oil, soybean oil, cottonseed oil, dehydrated castor oil, tung oil, safflower oil, peanut oil, various fish oils, or the $$-O\overset{O}{\overset{\|}{C}}R$$

group can be derived from pure materials such as oleic, linoleic, linolenic, palmitoleic, and ricinoleic acids. The oils may or may not be modified by alkali refining, blowing, or heat bodying.

The polyol used to produce the partial ester starting materials of the present invention can, in general, be selected from two different classes of compounds: simple, low molecular weight polyols, e.g., ethylene glycol, glycerol, trimethylol propane, pentaaerythritol,

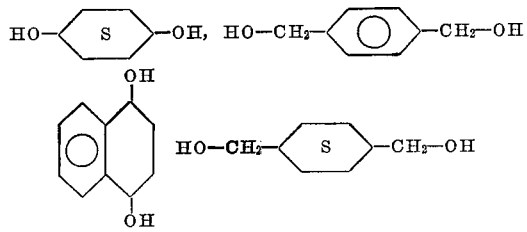

or their substituted derivatives so long as the substituents do not interfere with the reaction of the present invention; and polymeric polyols, e.g., polyether polyols, polyester polyols, polyurethane polyols, and polychlorohydrins.

By polymeric polyols is meant a conventional polyether or polyesters containing hydroxyl groups (preferably from about 300 to about 5,000 molecular weight); and polyurethane polyols, e.g., the polymer derived from hexamethylene diisocyanate and ethylene glycol, or the one derived from trimethylol propane and p-xylylene diisocyanate. As with all of the polyols, it is essential to the present invention that there be at least an average of 2 OH groups per molecule of polyol.

By aprotic solvents is meant compositions which are liquid under the conditions of the reaction, which have a high dielectric constant, (greater than about 15 at 25° C.), which are dipolar, that is, one part of the molecule has a more positive electrical charge relative to the other parts of the molecule causing the molecule to act as a dipole, are sufficiently inert not to enter into deleterious side reactions to a significant degree under the reaction conditions, and which do not possess hydrogen atoms capable of hydrogen bonding with or transferring to anions in solution in the reaction mixture. The aprotic solvent can be composed of a mixture of liquids so long as the over-all liquid compositions meet the above criteria. Preferred among the aprotic solvents are N-alkyl pyrollidones, dialkyl formamides (e.g., N,N-dimethylformamide), N,N-dimethylacetamide, acetonitrile, N-methylpyrrolidone, hexamethylphosphoramide, and tetramethylurea, especially those in which the alkyl groups are methyl groups. The most preferred solvent for the reaction of the present invention is N,N-dimethylformamide. Preferably from about 10 to about 100 and most preferably from about 25 to about 50 moles of the solvent will be present for each mole of dihalide starting material.

For purposes of this invention, the dihalide is preferably taken from the class of trans

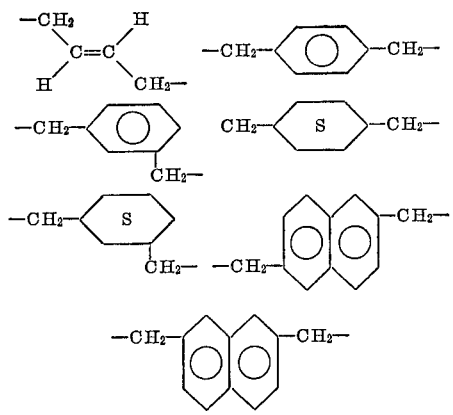

tetramethylene, pentamethylene, hexamethylene, heptamethylene, octamethylene, etc., or substituted derivatives thereof, which are free from substituents which interfere with the reaction of the present invention.

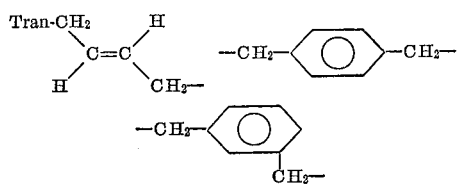

hexamethylene, and their substituted derivatives are preferred.

The reaction of the present invention is preferably conducted at a temperature of from about 25 to about 300° C. and most preferably at from 50 to about 150° C. Pressure is not critical and may be from below one atmosphere to over 10,000 p.s.i.g. In most cases, it will be preferable to conduct the reaction anaerobically on a batch-type basis, although flow systems may be utilized. The most convenient apparatus will in most cases be a conventional tight-lid varnish cooker or similar reactor having a reflux condenser, provision for agitation, and the usual controls for temperature and pressure.

In the examples which follow, the testing procedures are as set forth below:

The panels are steel or tin plated steel as identified in the examples generally 0.032 inch thick.

By draw down is meant that the films are drawn down with a conventional Gardner applicator to the indicated film thickness.

The film thicknesses are measured by a Gardner electrometer manufactured by Gardner Laboratory, Inc., Bethesda, Md.

By "set time" is meant the time required to render the film sufficiently viscous that it will not flow when raised to a vertical position.

By "tack-free" is meant the time required for the film to dry so that it does not noticeably adhere to the fingertip.

Sward hardness was in all cases measured conventionally by a Sward hardness rocker, model C manufactured by Gardner Laboratory, Inc., Bethesda, Md.

Flexibility was measured by bending the panel around a mandrel having the diameter indicated in each of the examples and "passed" means that the coating showed no noticeable fracturing or other failure after being so bent.

Impact, forward and reverse indicates that the coating was impacted with the indicated inch pounds without failure, and that the panel was then turned over and the reverse of the panel was impacted in a different area, without failure of the coating. The impacting apparatus was that manufactured by the Gardner Laboratory, Inc., modified to provide a maximum of 120 inch-pounds of impact.

Gloss was measured by a Gardner portable 60° gloss meter.

"Modified" ASTM Color was measured with a Fisher ASTM Colorimeter (ASTM D–1500) by inserting the Gardner viscosity tube containing the formulated experimental oil into the colorimeter light beam and taking the reading as usual.

In general, commercial grades of starting materials will be satisfactory for the reactions of the present invention, but anhydrous starting materials (containing less than about 1% and preferably less than about 0.5% by weight of water) will be preferred. The drying oils of the present invention will be useful for all of the purposes to which conventionally produced urethane drying oils are put and the method of application will, in general, be those well known to persons skilled in the art. For example, the coatings may be brushed, rolled, sprayed, flow-coated or otherwise conventionally applied to substrates which can include stone, metal, wood, plastics, glass, concrete and cinder block aggregates, etc. The substrates will usually be flat sheets but can also be other shapes as where the drying oils are used for varnishing wires to protect against corrosion or as insulating materials. Architectural shapes including wrought iron may also be coated. Clear wood finishes will be the most preferred use of the urethane drying oils of the present invention. Additional conventional drying oils may be admixed where they do not interfere with the invention.

In the examples which follow, certain materials are identified by their trade name in order to indicate that commercial grades of materials are satisfactory for the purposes of the present invention. These trade names are Skelly Solve B, a $C_5$–$C_7$ paraffin naphtha petroleum distillate manufactured by Skelly Oil Co. (Normal hexane could, of course, be substituted); ADM Superb, a commercial grade of linseed oil from Archer, Daniels Midland (alkali-refined linseed oils are preferred); and Exkin No. 2, an anti-skinning agent primarily used in coatings formulations and manufactured by the Nuodex Corporation, Elizabeth, N.J. By xylylene is meant the alpha, alpha' divalent radical of xylene, preferably meta and most preferably para-xylylene.

The examples which follow are intended to be illustrative of the invention and should not be considered as limiting it in any manner.

EXAMPLE I 200.0 g. clay-treated raw linseed oil is charged to a 500 ml. resin pot equipped with a magnetic stirrer, a reflux condenser, a dropping funnel, a thermometer, and a nitrogen inlet tube extending to the bottom of the pot. The oil is degassed by stirring 20 minutes at room temperature while $N_2$ is bubbled from the inlet tube. The oil is heated to 235° C. and held at this temperature by a thermowatch. 0.85 g. PbO is added as a transesterification catalyst, followed by dropwise addition of 43.2 g. glycerol over 1 hr. The mixture is stirred at 235° C. for an additional 4 hours then cooled. A slow $N_2$ flow is maintained in the reaction vessel throughout the above sequence.

The products are taken up in $Et_2O$ and washed 4 times with 10% aqueous $Na_2SO_4$ to remove excess glycerol. The ether is dried over anhydrous $MgSO_4$ and filtered. The ether is stripped off to yield the glycerides as a yellow-orange oily slush.

Twenty-five (25) g. of the above product is dissolved in 75 ml. purified dimethyl formamide (DMF). This solution is added to a 500 ml. reaction flask equipped with a mechanical stirrer, a reflux condenser with a mineral oil bubbler at the open end to maintain a constant head of $N_2$, an addition funnel, and a thermometer with thermowatch. 21.7 g. dry KOCN is added and the resulting slurry is held at 100° C. while 11.1 g. (0.0887 mole) 1,4-dichloro-2-butene in 25 ml. DMF is added over 2–4 hours. The reaction mixture is stirred for an additional 2–4 hours at 100° C., then cooled.

The reaction mixture is filtered, and the DMF is distilled from the filtrate at high vacuum leaving a viscous oil. The oil is taken up in Skelly B and filtered. The solvent is stripped off until the solution contains 40% solids (pure urethane oil). Ca and Pb naphthenates are added to catalyze the "drying" of the oil.

This formulation reduces to:

| Component: | Parts by wt. |
|---|---|
| Linseed oil | 54.0 |
| Glycerol | 11.6 |
| 2-butene-1,4-diisocyanate [1] | 34.4 |
|  | 100.0 |
| Skelly B | 250 |
| Ca naphthenate | 0.20 |
| Pb naphthenate | 0.04 |

Characteristics of formulated oil:
  Solids _____ 40 percent.
  Modified ASTM
    color _____ 0.5–1.0.
  Viscosity (Gardner) ____ ~D.

Evaluation of coating from oil:
  Panels _____ Steel.
  Drawdown _____ 5 mil wet.
  Film thickness dry _____ 0.2–0.4 mil.
  Set time _____ 1 min.
  Tack free _____ 22–35 min.
  Sward hardness:
    6 hours _____ 2.
    1 day _____ 5.
    2 days _____ 6–10.
    5 days _____ 10–14.
    6 days _____ 12–14.
    7 days _____ 12–14.
  Flexibility (7 days) ____ Passed ⅛ in. mandrel.
  Impact, forward and
    reverse _____ Passed 60 in. lb.
  Gloss (60°) _____ 83.
  Appearance after dry ___ Skinning on 75% of panels.
  Exposure _____ No yellowing after 8 weeks outdoor exposure.

[1] Based on the reaction,
$ClCH_2CH=CHCH_2Cl + 2KNCO \rightarrow OCNCH_2CH=CH-CH_2-NCO$
in all cases.

EXAMPLE II

Glycerides are prepared as for Example I from 237 g. linseed oil (ADM Superb) and 25.6 g. glycerol using 1.0 g. PbO as the catalyst. The reaction product is washed with aqueous Na$_2$SO$_4$ as in Example III.

25 g. of the glyceride product is reacted with 9.73 g. dry KOCN and 7.0 g. p-xylylene dichloride in the presence of 0.05 g. dibutyltin dilaurate catalyst according to the procedure of Example I. The reaction is stirred at 100° C. for 4 hours after completing the addition of the xylylene dichloride.

The reaction is worked up as in Example I, using xylene as the solvent. The xylene was stripped off to give a final formulation containing 60% solids. This formulation reduces to the following:

| Component: | Parts by wt. |
|---|---|
| Linseed oil | 69.5 |
| Glycerol | 7.4 |
| p-xylylene diisocyanate [1] | 23.1 |
|  | 100.0 |
| Xylene | 67.0 |
| Co naphthenate (6%) | 0.25 |
| Pb naphthenate (24%) | 0.50 |

Characteristics of formulated oil:
- Solids _____ 60 percent.
- Modified ASTM color _____ ~2.0.
- Viscosity (Gardner) _____ ~D.

Evaluation of Coating:
- Panels _____ Steel.
- Drawdown _____ 5 mil wet.
- Film thickness dry _____ 1 mil.
- Set time _____ 15 min.
- Tack free _____ 1.5 hours.
- Sward hardness:
  - 17 hours _____ 0–2.
  - 1 day _____ 0–2.
  - 3 days _____ 2.
  - 6 days _____ 2.
  - 7 days _____ 2–4.
- Flexibility (7 days) _____ Passed ⅛ in. mandrel.
- Impact—forward and reverse _____ Slight failure 90 in. lb.
- Gloss (60°) _____ 99–100+.
- Appearance after dry _____ Spotting due to non-wetting.

[1] Based on the reaction:

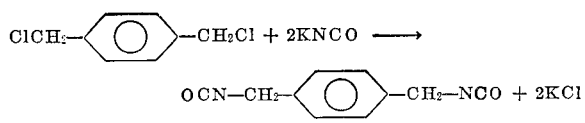

$$ClCH_2-\langle C_6H_4 \rangle-CH_2Cl + 2KNCO \longrightarrow$$
$$OCN-CH_2-\langle C_6H_4 \rangle-CH_2-NCO + 2KCl$$

EXAMPLE III

Glycerides are prepared as in Example I from 237 g. linseed oil (ADM Superb) and 51.2 g. glycerol using 1.0 g. PbO as a transesterification catalyst. The glyceride produced is not washed with Na$_2$SO$_4$ solution but is used as recovered from the transesterification.

25 g. of the crude glycerides is reacted with 15.4 g. dry KOCN and 9.51 g. 1,4-dichloro-2-butene, according to the procedure for Example I. The final oil is formulated to 50% solids in heptane (tech) using the workup procedure of Example I. The final formulation of the oil reduces to the following:

| Component: | Parts by wt. |
|---|---|
| Linseed oil | 59.5 |
| Glycerol | 13.0 |
| 2-butene-1,4-diisocyanate | 27.5 |
|  | 100.0 |
| Heptane (tech) | 100.0 |
| Ca Naphthenate (5%) | 0.10 |
| Pb Naphthenate (24%) | 0.02 |
| Co Naphthenate (6%) | 0.04 |
| Exkin #2 (anti-skinning agent) | 0.15 |

Evaluation of coating:
- Panels _____ Steel.
- Drawdown _____ 5 mil wet.
- Film thickness dry _____ 0.4–0.5 mil.
- Set time _____ 1 min.
- Tack free _____ 6 hours.
- Sward hardness:
  - 2 days _____ 6.
  - 3 days _____ 10.
  - 7 days _____ 10.
- Impact—forward and reverse _____ Passed 120 in. lb.
- Gloss (60°) _____ 98.
- Flexibility _____ Passed ⅛ in. mandrel.
- Appearance after dry _____ Clear, smooth.
- Exposure _____ No yellowing after 8 weeks' outdoor exposure.

EXAMPLE IV

Example II is repeated except for leaving out the dibutyltin dilaurate. The final product is brought to 50% solids in heptane. Final formulation:

| Component: | Parts by wt. |
|---|---|
| Linseed oil | 69.5 |
| Glycerol | 7.4 |
| p-Xylylene diisocyanate | 23.1 |
|  | 100.0 |
| Heptane (tech) | 100.0 |
| Pb naphthenate (24%) | 0.16 |
| Co naphthenate (6%) | 0.04 |
| Exkin #2 | 0.14 |
| Methanol | 1.5 |

Evaluation of coating:
- Panels _____ Steel.
- Drawdown _____ 5 mil wet.
- Film thickness, dry _____ 0.7 mil.
- Set time _____ 5 min.
- Tack free _____ 2.5 hours.
- Sward hardness:
  - 1 day _____ 4.
  - 2 days _____ 4–6.
  - 3 days _____ 6.
  - 4 days _____ 8.
  - 5 days _____ 8.
  - 6 days _____ 6.
  - 7 days _____ 6.
- Flexibility (7 days) _____ Passed ⅛ in. mandrel.
- Impact—forward and reverse _____ Passed 120 in. lb.
- Gloss (60°) _____ 93.
- Appearance after dry _____ Clear, smooth.
- Exposure _____ No yellowing after 8 weeks' outdoor exposure.

EXAMPLE V

Glycerides used are prepared as Example III. 25 g. of the crude glycerides is reacted with 15.4 g. dry KOCN and 13.5 g. p-xylylene dichloride according to the procedure for Example I. The final oil is insoluble aliphatic hydrocarbons but dissolves with difficulty in aromatics.

The oil is brought to 40% solids in xylene. The formulation of this oil reduces to the following:

| Component: | Parts by wt. |
|---|---|
| Linseed oil | 52.3 |
| Glycerol | 11.4 |
| p-xylylene diisocyanate | 36.3 |
| | 100.0 |
| Xylene | 150.0 |
| Pb naphthenate (24%) | 0.20 |
| Co naphthenate (6%) | 0.05 |
| Methanol | 4.0 |
| Exkin #2 | 0.14 |

Properties of formulated oil:
- Solids _____ 40 percent.
- Viscosity (Gardner) _____ M.
- Modified ASTM color _____ 1.5.

Evaluation of coating:
- Panels _____ Ground steel.
- Drawdown _____ 6 mil wet.
- Film thickness, dry _____ 0.6–0.8 mil.
- Set time _____ 1 min.
- Tack free _____ 10 min.
- Sward hardness:
  - 1 day _____ 8.
  - 2 days _____ 10–12.
  - 6 days _____ 14.
  - 7 days _____ 14–18.
- Flexibility (7 days) _____ Passed ⅛ in. mandrel.
- Impact—forward and reverse _____ Passed 120 in. lb.
- Gloss (60°) _____ 70–80.
- Appearance after dry _____ Spotting due to gel in formulated oil.

EXAMPLE VI

Linseed oil glycerides are prepared, according to the procedure in Example I from 250.0 g. linseed oil (ADM Superb) and 38.25 g. glycerol using 1.1 g. PbO for a catalyst. The glycerides are used as recovered (no $Na_2SO_4$ wash).

The urethane drying oil is made by reacting 25 g. of the crude glycerides with 13.9 g. dry KOCN and 9.97 g. p-xylylene dichloride according to the procedure in Example I. The final formulation of the oil is made in heptane. The final formulation corresponds to:

| Component: | Parts by wt. |
|---|---|
| Linseed oil | 60.7 |
| Glycerol | 9.3 |
| p-Xylylene diisocyanate | 30.0 |
| | 100.0 |
| Heptane (tech) | 100.0 |
| Pb naphthenate (24%) | 0.16 |
| Co Naphthenate (6%) | 0.04 |
| Exkin #2 | 0.14 |
| Methanol | 1.5 |

Characteristics of formulated oil:
- Solids _____ 50 percent.
- Viscosity (Gardner) _____ S.

Evaluation of coating:
- Panels _____ Ground steel.
- Drawdown _____ 6 mil wet.
- Film thickness, dry _____ 1.1 mil.
- Set time _____ 3 min.
- Tack free _____ 1.5 hours.
- Sward hardness:
  - 3 days _____ 8–10.
  - 4 days _____ 8–12.
  - 5 days _____ 10.
  - 6 days _____ 10.
  - 7 days _____ 8–12.
- Flexibility (7 days) _____ Passed ⅛ in. mandrel.
- Impact—forward and reverse _____ Passed 120 in. lb.
- Gloss (60°) _____ 96–99.
- Appearance after dry _____ Clear, smooth

EXAMPLE VII

Evaluation of a commercial urethane oil for comparison

"Spenkel F–77MS" (Commercial Urethane Oil manufactured by Spencer-Kellog Co.) is formulated as received to 60% solids in mineral spirits. Xylene is added to give a formulation of 45% solids. Co and Pb Naphthenates and Exkin #2 are added in concentrations comparable to previous examples. The results are as follows:

Characteristics of this formulation:
- Viscosity (Gardner) _____ A.
- Percent solids _____ 45% (in mineral spirits/xylene mix).
- Modified ASTM color _____ 0.5 (when formulated). 1.5 (after standing in lab for one month).

Evaluation of coating:
- Panels _____ Ground steel.
- Drawdown _____ 6 mil wet.
- Film thickness, dry _____ 1 mil.
- Set time _____ 10 min.
- Tack free _____ 1 hour.
- Sward hardness:
  - 1 day _____ 12–14.
  - 2 days _____ 18.
  - 6 days _____ 26.
  - 7 days _____ 30–32.
- Flexibility _____ Passed ⅛ in mandrel.
- Impact, forward and reverse _____ Passed 120 in. lb.
- Gloss (60°) _____ ~95.

EXAMPLE VIII

Glycerides are prepared as for Example I from 310 g. of linseed oil (ADM Superb) and 54.40 g. of pentaerythritol using 1.27 g. of calcium naphthenate as catalyst. The glyceride product is not washed with $Na_2SO_4$ solution but is used as recovered from the transesterification.

25 g. of the crude glycerides is reacted with 9.72 g. of KOCN and 10.0 g. of p-xylene dichloride according to the procedure in Example I. The final oil is formulated to 50% solids in xylene giving the following:

| Component: | Parts by wt. |
|---|---|
| Linseed oil | 60.5 |
| Pentaerythritol | 10.9 |
| p-Xylene diisocyanate | 28.6 |
| | 100.0 |
| Xylene | 100.0 |
| Pb naphthenate (24%) | 0.16 |
| Co naphthenate (6%) | 0.04 |
| Exkin #2 | 0.14 |

Evaluation of coating:
- Panels _____ Steel.
- Drawdown _____ 5 mil.
- Film thickness, dry _____ 2.3 mil.
- Set time _____ 5 min.
- Tack free _____ 40 min.
- Sward hardness:
  - 3 days _____ 7.
  - 5 days _____ 12.
  - 7 days _____ 24.
- Flexibility (7 days) _____ Passed ⅛ in. mandrel.
- Impact, forward and reverse _____ Passed 120 in. lb.
- Appearance after dry _____ Tan colored, smooth.
- Gloss _____ 98.

As with all of the products of the examples of the invention, the final oil contains more than 0.1% of isocyanurate groups based on the moles of nitrogen in the composition.

What is claimed is:
1. In a process for the preparation of unsaturated urethane drying oils comprising reacting organic dichlorides with alkali metal or quaternary ammonium cyanate and hydroxy-containing organic compounds which drying oils are soluble in mineral spirits, and which comprise molecules which contain both isocyanurate groups and urethane groups and in which the nitrogen of neither group is connected to an aromatic ring and which contain from about 1 to about 10 mole percent of isocyanurate groups based on the moles of nitrogen in the composition; the improvement comprising forming a reaction mixture comprising a mixture containing primary and secondary hydroxyl-containing esters of unsaturated fatty acid with an organic dichloride, and an alkali metal or quaternary ammonium cyanate wherein the dichloride is an unsaturated dichloride in which the chlorides are allylic or benzylic to the unsaturation and wherein the reaction is conducted in the presence of an aprotic solvent wherein the mole ratio of chlorine groups to hydroxy groups in said reaction mixture is from about 1.5 to about 0.5 and the mole ratio of NCO groups to chlorine groups is from about 1.0 to about 1.5.

2. A process according to claim 1 in which the mixture containing primary and secondary hydroxyl-containing esters of unsaturated fatty acids comprises a glyceride derived from a compound selected from the group consisting of linseed oil, soybean oil, cottonseed oil, dehydrated castor oil, tung oil, safflower oil, peanut oil, fish oils, oleic acid, linoleic acid, linolenic acid, palmitoleic acid, and ricinoleic acid.

3. The process of claim 2 wherein the mixture containing primary and secondary hydroxyl-containing esters of unsaturated fatty acids comprises a glyceride derived from polyols selected from the group consisting of ethylene glycol, glycerol, trimethylol, propane, pentaerythritol,

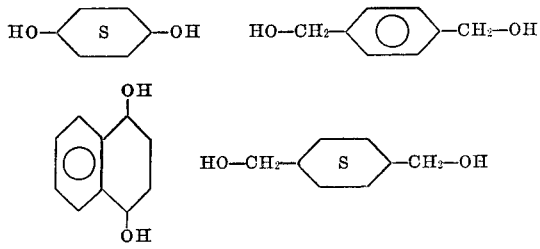

polyether polyols, polyester polyols, polyurethane polyols, and polychlorohydrins.

4. The process of claim 1 wherein the reaction is conducted at a temperature of from about 25 to about 300° C., and wherein the metal cyanate is the cyanate of a cation selected from the group consisting of Li, Na, K, Rb, Cs, Ca, Mg, Be, Ag, Pb, pyridinium, and tetralkyl ammonium radicals.

5. The process of claim 1 wherein the ester is prepared by the partial alcoholysis of an unsaturated triglyceride with a polyhydroxy compound.

6. The process of claim 4 wherein the polyhydroxy compound is selected from the group consisting of glycerin trimethylol propane and pentaerythritol.

7. The process of claim 6 wherein the polyhydroxyl compound is pentaerythritol.

8. The process of claim 1 wherein the aprotic solvent comprises a member of the group consisting of N-alkyl pyrrolidones, dialkyl formamides N, N-dimethylacetamide, acetonitrile, N-methylpyrrolidone, hexamethylphosphoramide, and tetramethylurea.

9. The process of claim 8 wherein the aprotic solvent comprises N, N-dimethylformamide.

10. The process of claim 6 wherein the aprotic solvent comprises a member of the group consisting of N-alkyl pyrrolidones, dialkyl formamides N, N-dimethylacetamide, acetonitrile, N-methylpyrrolidone, hexamethylphosphoramide, and tetramethylurea.

11. The process of claim 10 wherein the polyhydroxyl compound is pentaerythritol.

References Cited

UNITED STATES PATENTS

| | | | |
|---|---|---|---|
| 2,866,801 | 12/1958 | Himel et al. | 260—248 XR |
| 2,866,802 | 12/1958 | Graham | 260—248 XR |
| 2,866,803 | 12/1958 | De Pree | 260—453 |
| 2,697,720 | 12/1954 | Kaiser | 260—482 |
| 3,037,979 | 6/1962 | Fukui et al. | 260—248 |
| 3,379,687 | 4/1968 | Doss et al. | 260—482 XR |
| 3,458,448 | 7/1969 | Argabright et al. | 260—248 XR |
| 3,017,420 | 1/1962 | Schaeffer | 260—453 |
| 3,115,479 | 12/1963 | Windemuth et al. | 260—453 XR |
| 3,231,597 | 1/1966 | Fischer | 260—482 XR |
| 3,297,745 | 1/1967 | Fekete et al. | 260—482 XR |
| 3,318,828 | 5/1967 | Seiner | 260—404.5 |
| 3,345,388 | 10/1967 | Milligan | 260—404.5 |

FOREIGN PATENTS

| | | |
|---|---|---|
| 794,061 | 4/1958 | Great Britain. |

OTHER REFERENCES

Argabright et al., J. Org. Chem., vol. 30, pp. 3317–21 (October 1965).

Nagasawa et al., Bull of the Japan Petroleum Inst., vol. 6, pp. 72–8 (June 1964).

HENRY R. JILES, Primary Examiner

J. M. FORD, Assistant Examiner

U.S. Cl. X.R.

260—76, 77.5, 453, 471, 482

PO-1050
(5/69)

UNITED STATES PATENT OFFICE
CERTIFICATE OF CORRECTION

Patent No. 3,526,623  Dated Sept. 1, 1970

Inventor(s) P. A. Argabright and B. L. Phillips

It is certified that error appears in the above-identified patent and that said Letters Patent are hereby corrected as shown below:

Col. 2, line 57: should read -- . . . K, Rb, Cs, Ag, Be, . . . --

SIGNED AND
SEALED
DEC 15 1970

(SEAL)
Attest:

Edward M. Fletcher, Jr.
Attesting Officer

WILLIAM E. SCHUYLER, JR.
Commissioner of Patents